(12) United States Patent
Ellis

(10) Patent No.: US 9,210,963 B1
(45) Date of Patent: Dec. 15, 2015

(54) MULTI-FUNCTIONAL PROTECTIVE HELMET

(71) Applicant: Kelly J. Ellis, Oklahoma City, OK (US)

(72) Inventor: Kelly J. Ellis, Oklahoma City, OK (US)

( * ) Notice: Subject to any disclaimer, the term of this patent is extended or adjusted under 35 U.S.C. 154(b) by 0 days.

(21) Appl. No.: 14/495,164

(22) Filed: Sep. 24, 2014

Related U.S. Application Data

(60) Provisional application No. 61/881,527, filed on Sep. 24, 2013.

(51) Int. Cl.
| | |
|---|---|
| *H04B 1/38* | (2015.01) |
| *A42B 3/30* | (2006.01) |
| *A42B 3/12* | (2006.01) |
| *A42B 3/08* | (2006.01) |
| *A42B 3/22* | (2006.01) |
| *H04R 1/02* | (2006.01) |
| *H04B 1/16* | (2006.01) |

(52) U.S. Cl.
CPC ... *A42B 3/30* (2013.01); *A42B 3/08* (2013.01); *A42B 3/12* (2013.01); *A42B 3/221* (2013.01); *H04B 1/16* (2013.01); *H04R 1/028* (2013.01)

(58) Field of Classification Search
CPC .............................. H04B 1/3833; H04B 1/385
USPC ............................................. 455/90.3, 575.2
See application file for complete search history.

(56) References Cited

U.S. PATENT DOCUMENTS

| | | | |
|---|---|---|---|
| 3,142,833 A | 7/1964 | Bosley et al. | |
| D255,283 S | 6/1980 | Piche | |
| 4,581,776 A * | 4/1986 | Kie ........................ | A42B 3/122 2/413 |
| 4,788,724 A * | 12/1988 | Lazzeroni ................ | H04R 1/08 2/422 |
| 6,283,344 B1 * | 9/2001 | Bradley ................... | A42B 1/24 222/175 |
| 7,075,250 B2 | 7/2006 | Colwell | |
| 7,304,442 B2 | 12/2007 | Colwell | |
| 7,598,927 B2 * | 10/2009 | Yamazaki .............. | G02B 27/01 345/4 |
| 8,001,623 B2 * | 8/2011 | Gertsch .................... | A42B 3/04 2/410 |
| 8,176,574 B2 | 5/2012 | Bryant et al. | |
| 8,695,121 B2 * | 4/2014 | Nolan ..................... | A42B 3/24 2/171.3 |
| 9,060,221 B1 * | 6/2015 | Kaplan .................... | A42B 3/30 |
| 2002/0044535 A1 * | 4/2002 | Tabata ..................... | H04B 7/26 370/276 |
| 2002/0176595 A1 * | 11/2002 | Lazzeroni ............... | A42B 3/30 381/376 |
| 2003/0071766 A1 * | 4/2003 | Hartwell ................ | A42B 3/046 345/8 |
| 2006/0277666 A1 | 12/2006 | Gertsch et al. | |
| 2008/0289085 A1 | 11/2008 | Bryant et al. | |
| 2009/0218884 A1 * | 9/2009 | Soar .......................... | F41H 1/02 307/11 |
| 2011/0089894 A1 * | 4/2011 | Soar .......................... | B60N 2/44 320/108 |
| 2012/0243211 A1 | 9/2012 | Boulan | |
| 2013/0039038 A1 | 2/2013 | Jones | |
| 2013/0093585 A1 | 4/2013 | Ambani | |
| 2013/0215281 A1 * | 8/2013 | Hobby .................... | G06F 3/005 348/207.1 |
| 2015/0105035 A1 * | 4/2015 | de Oliveira ............ | H04B 1/385 455/90.3 |

FOREIGN PATENT DOCUMENTS

WO 2013057745 A1 4/2013

* cited by examiner

*Primary Examiner* — April G Gonzales

(74) *Attorney, Agent, or Firm* — Montgomery Patent & Design; Robert E. Montgomery

(57) ABSTRACT

A multi-functional protective helmet has various integrated alarm and communication devices associated with survival scenarios and dangerous activities. A front outside surface of the helmet is provided with a lamp. Within a dome portion of the helmet are a radio transmitter and receiver capable of wireless communication. A rechargeable battery unit supplies electrical power to the electrical components of the helmet. A side surface of the helmet is provided with a compartment configured to hold a whistle or other emergency aid. The helmet is also provided with a transparent face-shield.

20 Claims, 5 Drawing Sheets

MULTI-FUNCTIONAL PROTECTIVE HELMET

RELATED APPLICATIONS

The present invention was first described in and claims the benefit of U.S. Provisional Application No. 61/881,527, filed Sep. 24, 2013, the entire disclosures of which are incorporated herein by reference.

FIELD OF THE INVENTION

The present invention relates to a protective helmet equipped with various electronic components to provide additional functionality to the helmet that aids in survivability of a user wearing the helmet in distressed situations.

BACKGROUND OF THE INVENTION

Those of us who live in areas where rough terrain or vast wilderness areas are present know the physical dangers that these locations hold. All too often the news is filled with stories of unfortunate individuals who have become lost while hiking, camping, hunting or fishing, and ultimately end up dying. The vast areas encountered means that a person can wander for days without seeing another person, or even a sign of civilization. Cell phones and radios typically do not work well in such locations, and not everyone can afford to carry a personal locator beacon (PLB). The only remaining method of finding someone is by a massive manhunt which occupies much time and manpower. Even then, such searches can only be conducted during the day, perhaps doubling the amount of time it will take to find someone.

Also, there are many sports that require the use of helmets such as football, baseball, bicycle riding, hockey, motor sports, and the like. All of these helmets differ in their overall appearance and function, but share the common goal of protecting the user's head from impact. Different areas of coverage, padding, internal suspension, and even the materials used all share the common goal of providing impact protection. These same protective properties are also important in helmets used in medical, construction, military, and law enforcement activities as well. Manufacturers and researchers are constantly on the lookout for new materials, applications, and processes to enhance the safety properties of their protective helmets.

Accordingly, there exists a need for a means by which a person lost in a wilderness location can easily be located, such as a crash victim or otherwise disabled wearer of the helmet, without the disadvantages as described above. The development of the present invention fulfills this need.

SUMMARY OF THE INVENTION

The inventor has seen a need for such a device to provide a way to automatically alert passersby, onlookers, and/or emergency personnel to an accident.

In order to accomplish this need, it is an object of the present invention to provide a helmet having a first layer shaped into a dome, a second layer, substantially in a shape matching said first layer adhesively affixed to the second layer; a chin strap attaching the helmet to a user, and a generally "U"-shaped visor affixed to lateral sides of the helmet via a second fastening mechanism. In at least one (1) embodiment, the visor is a rigid, translucent material.

It is a further object of the present invention to provide a control panel disposed at an inner surface of the first layer and a switching assembly disposed at an inner surface of the first layer, where the switching assembly automatically activates a transceiver unit in communication with a GPS device to transmit positional data when sensing an accident.

It is a further object of the present invention to provide a speaker housed within the first layer and a siren disposed on an outer surface of the second layer.

It is a further object of the present invention to provide a microphone housed within the first layer configured to be located adjacent a mouth of a wearer of the helmet.

It is yet another object of the present invention to provide a weather band radio housed within the first layer.

It is still yet another object of the present invention to provide an illuminating lamp disposed on an outer surface of the second layer.

It is still yet another object of the present invention to provide a storage compartment molded into a side surface of the second layer, which further has a door for providing access to the storage compartment. Mounted to the outer surface of the first layer, within the storage compartment, is a recoiling mechanism. A lanyard with a clip is connected to the recoiling mechanism. In at least one (1) embodiment, a whistle is attached to the lanyard distal from the recoiling assembly and capable of being fully stored within the storage compartment.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

| DESCRIPTIVE KEY | |
|---|---|
| 10 | protective helmet |
| 20 | domed structure |
| 25 | recessed profile |
| 30 | first layer |
| 35 | adhesive layer |
| 40 | second layer |
| 50 | transmitter |
| 60 | receiver |
| 65 | accelerometer |
| 80 | edging |
| 90 | chin strap assembly |
| 100a | first strap |
| 100b | second strap |
| 120 | coupling mechanism |
| 140 | visor/face-shield |
| 150 | first fastening mechanism |
}

-continued

| | DESCRIPTIVE KEY |
|---|---|
| 160 | second fastening mechanism |
| 170 | control module |
| 172 | knob |
| 174 | pushbutton |
| 180 | battery |
| 200 | lamp |
| 205 | illumination |
| 210 | global positioning system (GPS) |
| 230 | radio |
| 235 | speaker |
| 237 | microphone |
| 240 | siren |
| 242 | sound |
| 245 | whistle |
| 250 | storage compartment |
| 260 | door |
| 270 | latch |
| 280 | recoiling mechanism |

DETAILED DESCRIPTION OF THE PREFERRED EMBODIMENT

The best mode for carrying out the invention is presented in terms of its preferred embodiment, herein depicted within FIGS. 1 through 4. However, the invention is not limited to the described embodiment and a person skilled in the art will appreciate that many other embodiments of the invention are possible without deviating from the basic concept of the invention, and that any such work around will also fall under scope of this invention. It is envisioned that other styles and configurations of the present invention can be easily incorporated into the teachings of the present invention, and only one particular configuration shall be shown and described for purposes of clarity and disclosure and not by way of limitation of scope.

The terms "a" and "an" herein do not denote a limitation of quantity, but rather denote the presence of at least one of the referenced items.

The present invention describes a protective helmet equipped with various communicative components (herein described as the "device") 10, to provide additional functionality to the helmet to aid in survivability of a user wearing the device 10 in distressed situations such as weather related disasters, avalanches, and the like.

Figure 1:
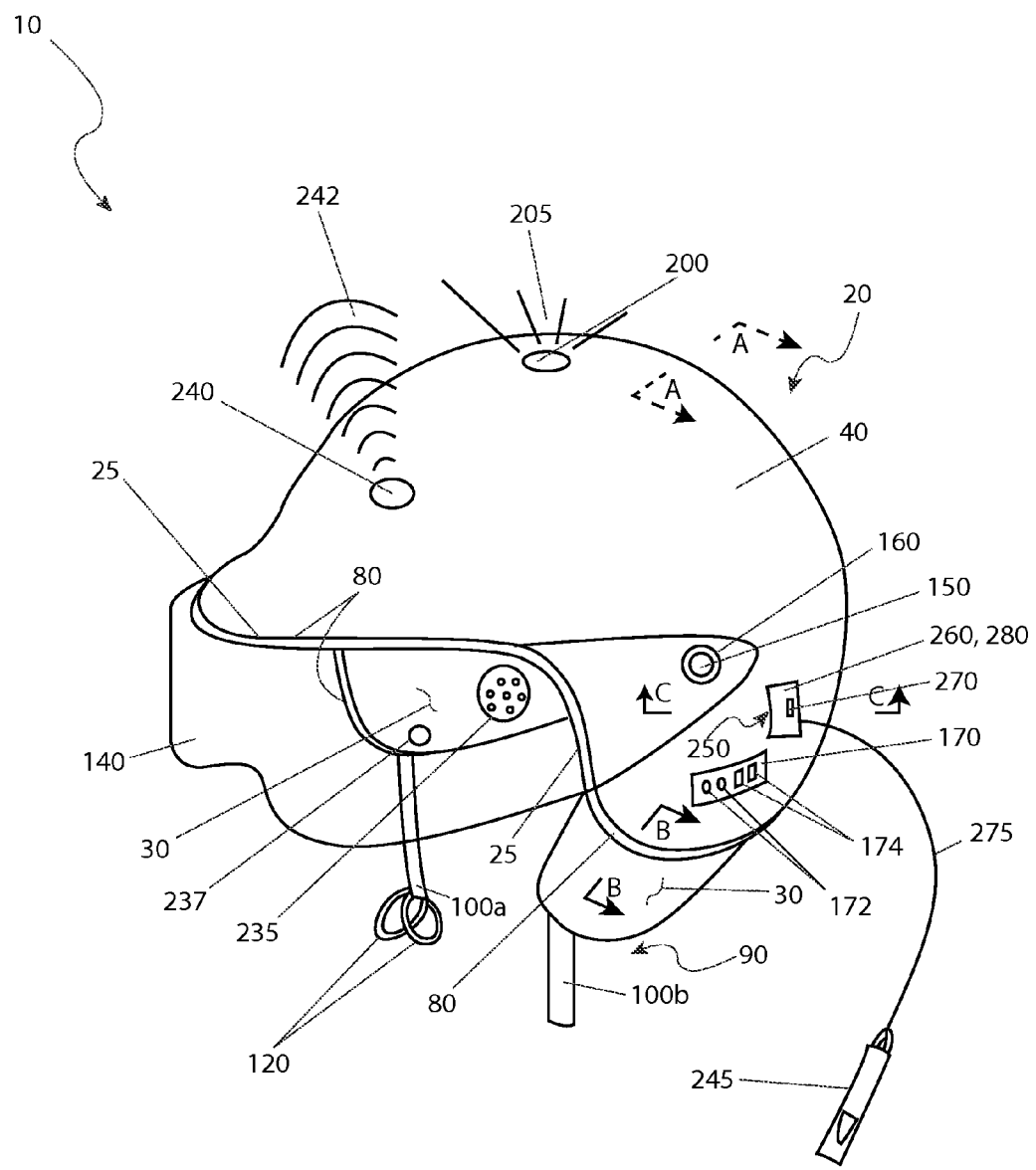
FIG. 1 is a perspective view of the multi-functional protective helmet 10, according to a preferred embodiment of the present invention.
Figure 2A:
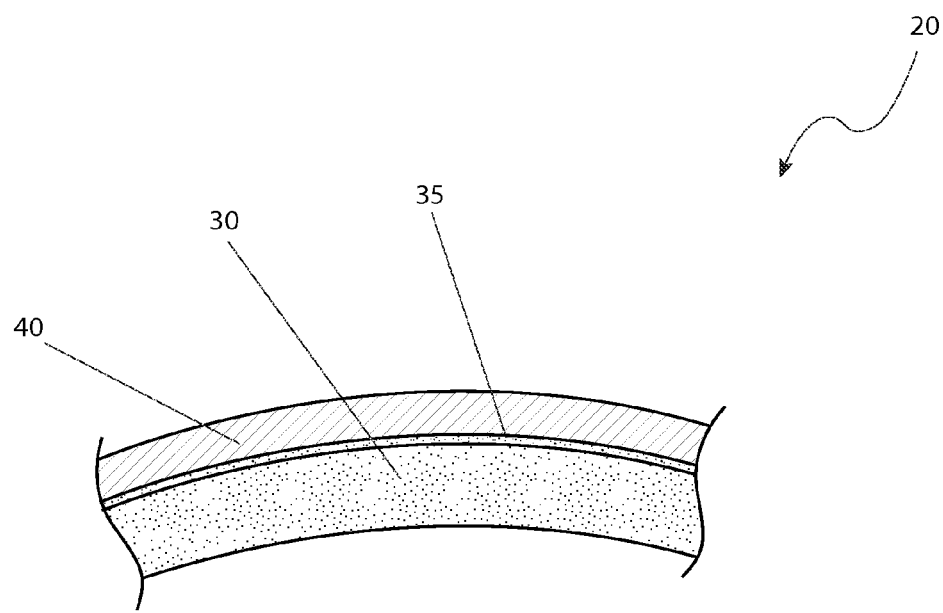
FIG. 2a is a sectional view of a domed structure portion 20 of the helmet 10 taken along section line A-A (see FIG. 1), according to a preferred embodiment of the present invention.
Figure 2B:
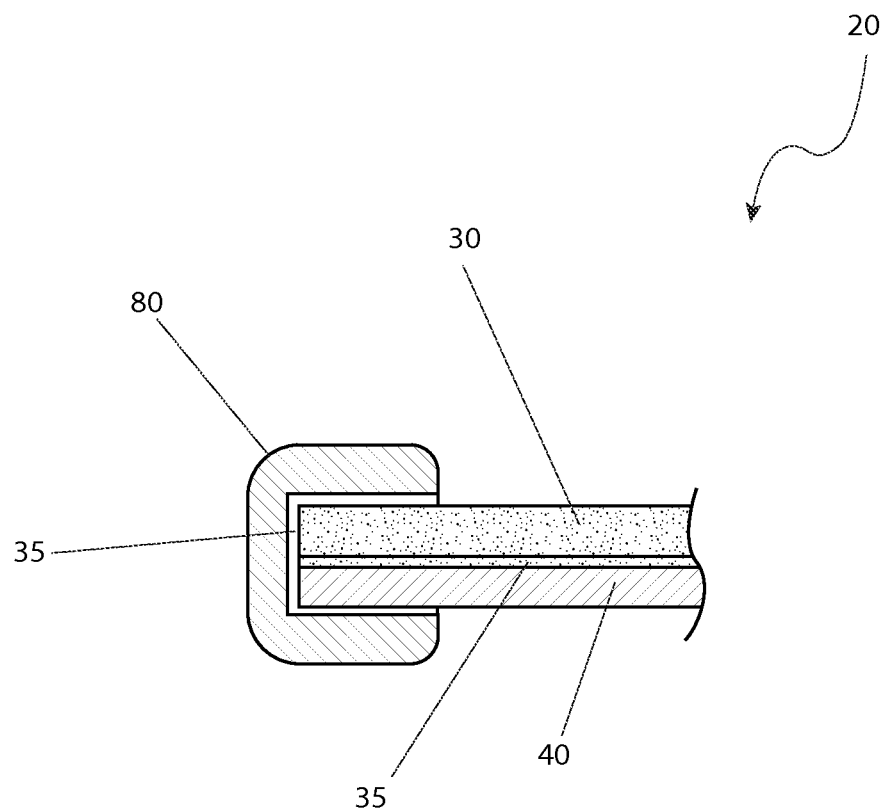
FIG. 2b is another sectional view of the domed structure 20 taken along section line B-B (see FIG. 1) depicting an edging portion 80, according to a preferred embodiment of the present invention.

Referring now to FIGS. 1, 2a, and 2b, perspective and sectional views of the device 10, according to a preferred embodiment of the present invention, are disclosed. The device 10 comprises a domed structure 20 having a first layer 30 and a second layer 40. The second layer 40 rests on top of, and is bonded to, the first layer 30. The first 30 and second 40 layers are formed in a dome shape to conform to a shape of a user's head. It is envisioned for the configuration of the first 30 and second 40 layers to have a recessed profile 25 about its forward perimeter edge to provide for better viewing while fully protecting the sides and rear portions of a user's head. A conventional open-face helmet is shown here for illustration sake; however, it is understood that other configurations, such as full-face, off-road, and half-helmet designs, may also utilize the teachings of the device 10, and as such should not be interpreted as a limiting factor of the device 10. The device 10 provides various incorporated components such as, but not limited to: a radio frequency (RF) transmitter 50, an RF receiver 60, an accelerometer 65, a visor/face-shield 140, a control module 170, a battery 180, a lamp 200, a GPS system 210, a speaker 235, a siren 240, and an emergency whistle 245 (also see FIG. 4).

In use, a user dons the device 10 by inserting their head within a concave portion of the domed structure 20, allowing the user's head to make contact with the first layer 30. The device 10 is employed to deflect and absorb impact imparted on the first and second layers 30, 40. In addition to expected physical protection from projectiles, the various components of the device 10 enable a user to establish and maintain various means of communication with others in a wireless manner.

The domed structure 20 provides a lamp 200 and a siren 240 along outer surfaces to communicate respective local illumination 205 and an audible sound 242 in the event of an emergency. The lamp 200 and siren 240 also automatically establish contact with emergency personnel if the need arises, if so configured.

The first layer 30 comprises a padding material which exhibits flexibility and resilience, but with no plastic deformation. The first layer 30 may absorb impact, but the intent of the first layer 30 is to provide comfort and damping of shock waves transferring through the device 10 when the device 10 is impacted. It is further envisioned that the first layer 30 may provide a material having a matrix substrate to allow bonding and formation of air pockets at interstitial points throughout the material such as a polystyrene composite; however, it is understood that other materials exhibiting similar properties may be utilized without deviating from the teachings of the device 10, and as such should not be interpreted as a limiting factor of the device 10. The forming of the material into the domed shape of the first layer 30 is done through an extrusion, molding, or forming process.

The second layer 40 is also formed in a dome shape and substantially conforms to the configuration of the first layer 30. The second layer 40 comprises a hard polymer shell to contain the first layer 30 and provide a deflection layer. The deflection properties of the second layer 40 are manifested by its rigidity and the fact that it forms a transformation in shockwave transmission. Shockwaves are transmitted via oscillatory motion of the transferring medium, and the second layer 40, being constructed of a material exhibiting a mechanical resonance frequency different than that of the first layer 30, assists in dampening the transfer of the shockwave. It is envisioned for the second layer 40 to be made using a rigid polymer; however, it is understood that other rigid materials may be utilized without deviating from the teachings of the device 10, and as such should not be interpreted as a limiting factor of the device 10. The forming of the second layer 40 into its dome shape is done through an extruding, molding, stamping, or casting process. The second layer 40 is affixed to the first layer 30 with the application of an adhesive layer 35 to bind the surfaces together and resist separation under normal use and wear by creating a chemical bond between each layer 30, 40 and the adhesive layer 35 (see FIG. 2a).

A perimeter edge of the dome structure 20 is provided with an edging portion 80. The edging 80 provides a "U"-shaped cross sectional trim which lines the perimeter edge and provides a cosmetic finish to the device 10 as well as assists with holding the layers 30, 40 of the domed structure 20 together. It is envisioned that the edging 80 is made using a rigid polymer or equivalent material. The edging 80 is affixed to the domed structure 20 with the application of an adhesive layer 35 to bind the surfaces together to resist separation (see FIG. 2b).

The device 10 provides a chin strap assembly 90 located along lower edge portions of the domed structure 20. The chin strap assembly 90 includes opposing first strap 100a and a second strap 100b portions. The strap portions 100a, 100b of the chin strap assembly 90 are positioned at lateral sides of the device 10. It is envisioned that one (1) end portion of each strap 100a, 100b is to be riveted or otherwise affixed to the domed structure 20. The loose end portions of the straps 100a, 100b provide removable attachment via engagement of a permanently sewn-in coupling mechanism 120 portion of the first strap 100a, being illustrated here as a conventional 2-ring device; however, it is understood that other approved helmet strap devices may be utilized with equal benefit, and as such should not be interpreted as a limitation of scope.

The front face portion of the domed structure 20 is provided with a visor/face-shield 140. The visor/face-shield 140 comprises a transparent rigid material preferably fabricated using a plastic such as LUCITE®, polycarbonate, or similar material. The visor/face-shield 140 provides protection to a user's face by covering a part or the entire recessed profile portion 25 of the domed structure 20, while allowing a user to maintain a frontal field of view while the device 10 is donned on a user's head. The visor/face-shield 140 is substantially "U"-shaped and is rotatingly attached to side surface portions of the domed structure 20 via engagement of respective first fastening mechanism 150 and second fastening mechanism 160 portions. The first fastening mechanism 150 is envisioned to provide an axial member being engaged within the second fastening mechanism 160, thereby enabling pivoting motion of the visor/face-shield 140. This configuration enables a user to position the visor/face-shield 140 in a lowered position and in front of a user's face or in a raised position where the visor/face-shield 140 is slid over a top portion of the domed structure 20. In another embodiment, a stationarily mounted visor/face-shield 140 is provided having perimeter edges which are sealed to the domed structure 20 with the application of an adhesive layer 35 to bind the surfaces together to resist separation under normal use by creating a chemical bond between the domed structure 20 and the adhesive layer 35.

Figure 3:
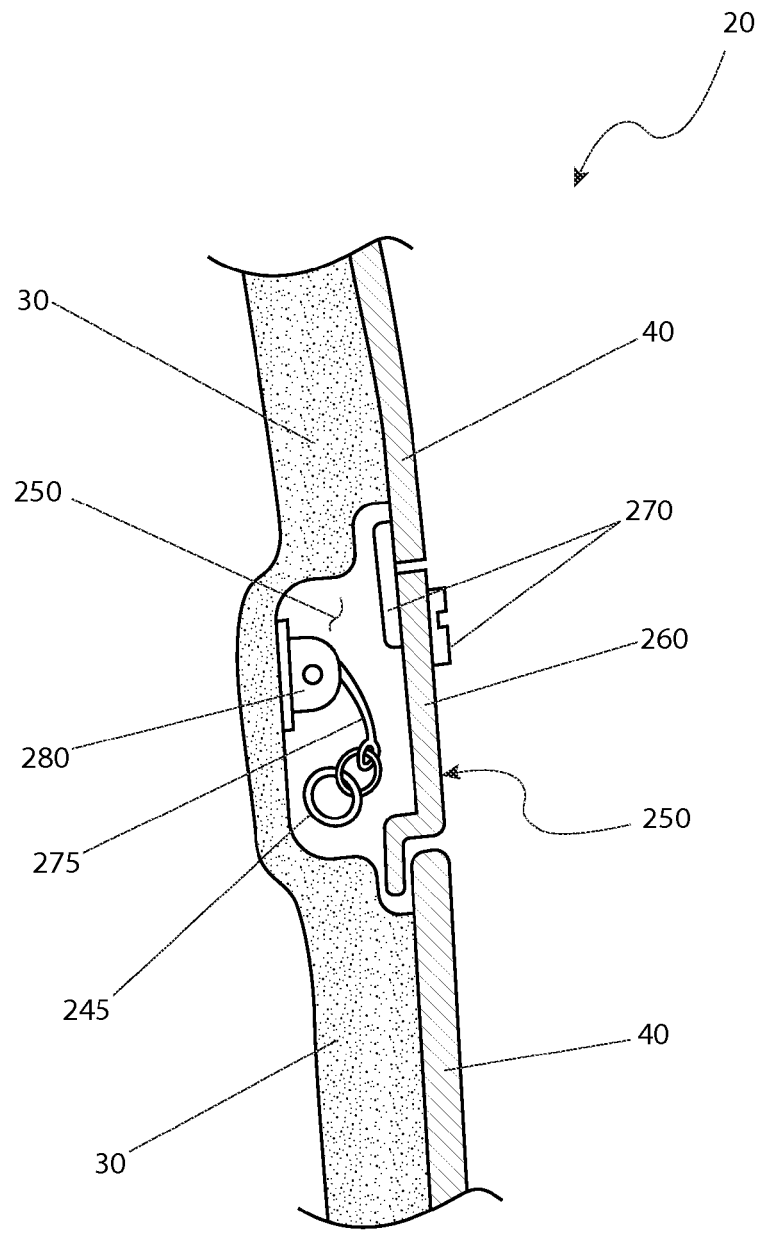
FIG. 3 is a sectional view of the domed structure 20 depicting a storage compartment 250 taken along section line C-C (see FIG. 1), according to a preferred embodiment of the present invention; and, FIG. 4 is an electrical block diagram of the helmet 10, according to a preferred embodiment of the present invention.

Referring now to FIG. 3, a sectional view of the domed structure 20 depicting a storage compartment 250 taken along section line C-C (see FIG. 1), according to a preferred embodiment of the present invention, is disclosed. The second layer 40 is provided with a storage compartment 250 along a side surface portion. The storage compartment 250 provides a rectangular recessed area into the second layer 40 and is provided with a door 260 that is hingedly attached to a perimeter edge of the storage compartment 250. The door 260 is provided with a latch 270 to assist a user in maintaining the door 260 in a closed position. A side surface within the storage compartment 250 is provided with a retractable lanyard clip 275. The retractable lanyard clip 275 is provided with a recoiling mechanism 280 to enable retraction of the lanyard clip 275 back into the storage compartment 250 after use. The recoiling mechanism 280 is mounted to the exterior of the first layer 30 within the storage compartment 250. The storage compartment 250 is constructed of a size and shape to hold a whistle 245 if so desired, which may be attached to the lanyard clip 275; however, it is understood that any item of commensurate size may be affixed and stored within the storage compartment 250. The door 260 is preferably formed to match the exterior contour of the second layer 40 in a flush-mounted manner.

Figure 4:
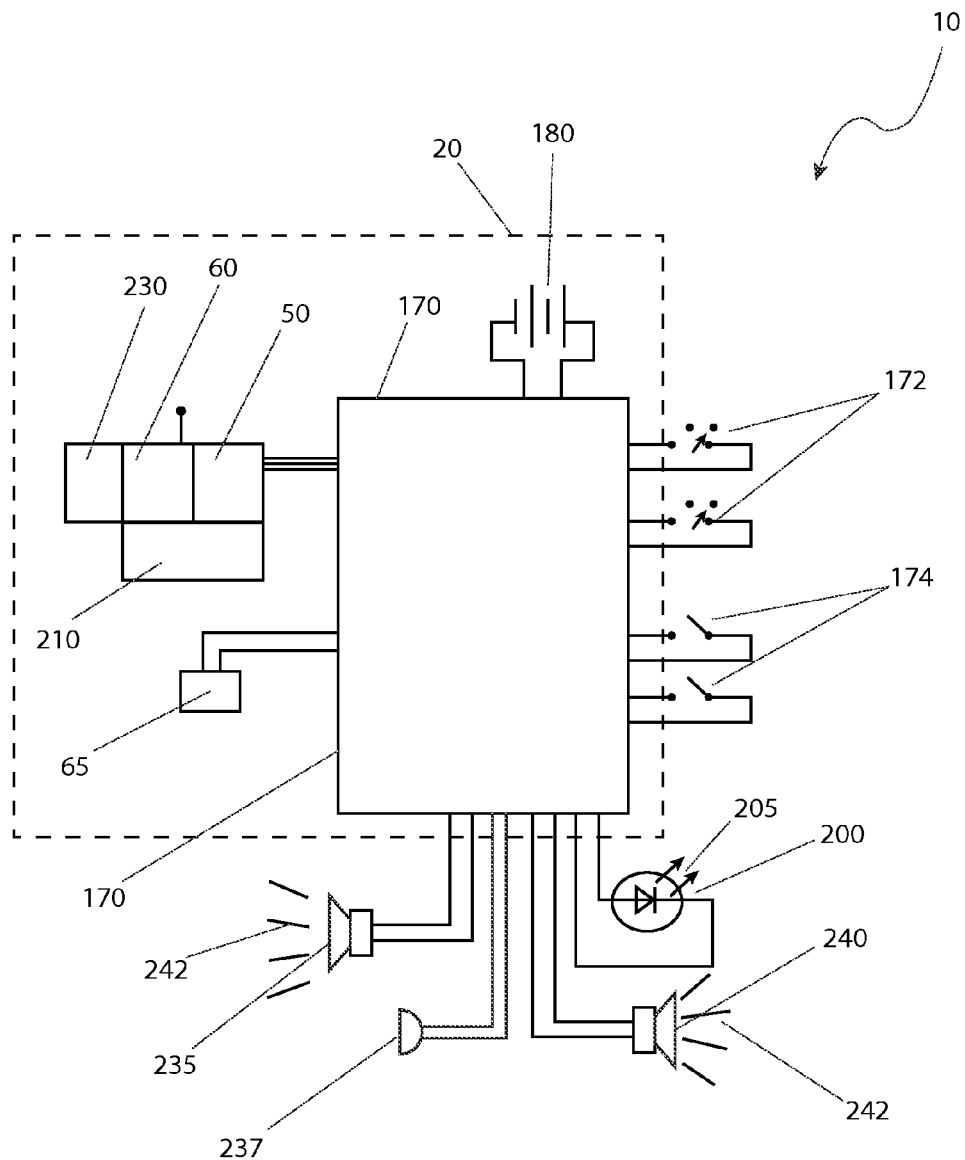

Referring now to FIG. 4, an electrical block diagram of the device 10, according to a preferred embodiment of the present invention, is disclosed. The device 10 is provided with a control module 170 located upon an outer side surface of the second layer 40. The control module 170 is placed into electrical communication with a rechargeable battery unit 180 which acts to provide an electrical power supply to the electrical and electronic portions of the device 10 housed within the domed structure 20.

The electrical and electronic portions of the device 10 include, but are not limited to: an RF transmitter 50, an RF receiver 60, an accelerometer 65, a lamp 200, a GPS system 210, a radio 230, a speaker 235, a microphone 237, and a siren 240. Each component 50, 60, 65, 200, 210, 230, 235, 237, 240 is placed into electrical communication with the control module 170 and battery 180 portions. The lamp 200 and the siren 240 are disposed on an outer surface of the second layer 40 to provide respective local illumination 205 and audible sound 242 communication in the event of an emergency (see FIG. 1). The lamp 200 is preferably made up of at least one (1) light-emitting diode (LED) or equivalent illuminating technology. The siren 240 is preferably a piezo-type speaker unit or equivalent miniature audio broadcasting device.

The GPS system 210, transmitter 50, receiver 60, and radio 230 portions are disposed at an inner surface of the first layer 30. It is understood that the transmitter 50 and receiver 60 portions may be configured in combination as a transceiver unit, without being interpreted as a limitation of scope. Additionally, it is understood that the transmitter 50, receiver 60, and GPS system 210 may transmit and receive positional data and RF signals using separate or combined antenna portions, without being interpreted as a limitation of scope.

At least one (1) speaker 235 is located along an inside surface of the first layer 30 and placed at a position which corresponds to the ear region of the user. A microphone 237 is also located upon an inside surface of the first layer 30 and placed at a position which corresponds to the mouth region of the user (see FIG. 1). The speaker 235 and microphone 237 portions are in electrical communication with the transmitter 50 and receiver 60 portions to enable a user to communicate with others, such as emergency personnel, in a wireless manner. The speaker 235 also allows the user to listen to the radio 230 so as to monitor weather forecasts and the like, when desired. The GPS system 210, LED light 200, and siren 240 may be activated at the discretion of the user using an externally-mounted knob 172 or a push-button 174, or be automatically activated via the accelerometer 65 when an impact is detected to automatically establish wireless communication with emergency personnel as to where the device 10 and user are located, thereby assisting rescue personnel in a search. The control module 170 is configured having a plurality of knobs 172 and push-buttons 174 along an exposed surface to enable a user to operate and control the various functions of the device 10, as well as enabling a user to override the automatic function of the accelerometer 65.

The internal accelerometer 65 provides automatic switching of the lamp 200 and siren 240 portions upon an impact event. The configuration of the accelerometer 65 is such that when the accelerometer 65 experiences a certain change in acceleration/deceleration, indicating an impact to the device 10, certain switching occurs to activate the lamp 200 and siren 240 portions, as well as the GPS system 210, in order to establish contact with emergency personnel.

It is envisioned that other styles and configurations of the present invention can be easily incorporated into the teachings of the present invention, and only one particular configuration shall be shown and described for purposes of clarity and disclosure and not by way of limitation of scope.

The preferred embodiment of the present invention can be utilized by the enabled user in a simple and straightforward manner with little or no training. The device 10 would be configured as indicated in FIG. 1 upon the initial purchase or acquisition.

The method of utilizing the device 10 may be achieved by performing the following steps: acquiring a model of the device 10 being suitable for an intended usage and type of protection, and which provides a correct fit upon one's head; donning the device 10; affixing the first strap 100*a* to the second strap 100*b* by engaging the coupling mechanism 120; configuring the desired manual and automatic functions of the device 10 using the knob 172 and pushbutton 174 portions of the control module 170; receiving pertinent information from the radio 230 and transmitter 60 concerning weather forecasts and the like; communicating with others, such as emergency personnel, as needed, using the transmitter 50 and receiver 60; activating the lamp 200 and siren 240 manually via the knob 172 and pushbutton 174 portions of the control module 170 when the need arises; or, alternatively allowing the accelerometer 65 to automatically activate lamp 200 and siren 240 portions as well as activate the transmitter 60 to communicate data from the GPS system 210 upon sensing an impact; accessing the storage compartment 250 using the latch 270, to utilize items such as a whistle 245 being tethered upon the recoiling mechanism 280; and, benefiting from cranial protection as well as a multi-functional communication means during an emergency, afforded a user of the present invention 10.

The foregoing descriptions of specific embodiments of the present invention have been presented for purposes of illustration and description. They are not intended to be exhaustive or to limit the invention and method of use to the precise forms disclosed. Obviously many modifications and variations are possible in light of the above teaching. The embodiment was chosen and described in order to best explain the principles of the invention and its practical application, and to thereby enable others skilled in the art to best utilize the invention and various embodiments with various modifications as are suited to the particular use contemplated. It is understood that various omissions or substitutions of equivalents are contemplated as circumstance may suggest or render expedient, but is intended to cover the application or implementation without departing from the spirit or scope of the claims of the present invention.

What is claimed is:

1. A helmet comprising:
   a first layer shaped into a dome;
   a second layer, substantially in a shape matching said first layer;
   an adhesive affixing said second layer to said first layer;
   a control panel disposed at an inner surface of said first layer;
   a switching assembly disposed at an inner surface of said first layer, wherein said switching assembly is placed into electrical communication with said control panel;
   an electrical power supply placed into electrical connection with said control panel and said switching assembly;
   a transceiver unit housed within said first layer and placed into electrical communication with said control panel, said switching assembly, and said electrical power supply;
   a speaker housed within said first layer and placed into electrical communication with said transceiver unit, said control panel, said switching assembly, and said electrical power supply;
   a microphone housed within said first layer and placed into electrical communication with said transceiver unit, said control panel, said switching assembly, and said electrical power supply;
   a weather band radio housed within said first layer and placed into electrical communication with said control panel, said switching assembly, and said electrical power supply;
   a GPS device housed within said first layer and placed into electrical communication with said control panel, said switching assembly, and said electrical power supply;
   a siren disposed on an outer surface of said second layer and placed into electrical communication with said control panel, said switching assembly, and said electrical power supply; and,
   a illuminating lamp disposed on an outer surface of said second layer and placed into electrical communication with said control panel, said switching assembly, and said electrical power supply;
   wherein said control panel comprises a plurality of control means, each providing selective control of said switching assembly, said transceiver unit, said speaker, said microphone, said radio, said GPS device, said siren, and said illuminating lamp;
   wherein said switching assembly is activated upon sensing an impact;
   wherein said switching assembly automatically activates said siren, said GPS device, and said illuminating lamp upon activation; and,
   wherein said GPS device is adapted to be in wireless communication with a remote logging system, said GPS device transmitting positional date upon activation by said switching assembly.

2. The helmet recited in claim 1, wherein said first layer comprises a foam material.

3. The helmet recited in claim 1, wherein said second layer comprises a rigid material.

4. The helmet recited in claim 1, wherein said first layer and said second layer are each configured to have a recessed profile about each perimeter edge at a front portion of said helmet.

5. The helmet recited in claim 1, further comprising a stripping located about a perimeter edge thereof.

6. The helmet recited in claim 1, further comprising a strap located at each side thereof and attached to an outer surface of said second layer, wherein a first fastening mechanism is provided to removably secure each strap end to each other.

7. The helmet recited in claim 1, further comprising a visor affixed to lateral sides of said helmet via a second fastening mechanism.

8. The helmet of recited in claim 7, wherein said visor is substantially U-shaped.

9. The helmet recited in claim 7, wherein said visor is a rigid, translucent material.

10. The helmet recited in claim 7, wherein perimeter edges of said visor are adhesively bonded to said first layer.

11. The helmet recited in claim 7, wherein said second fastening mechanism is a pivoting fastener to enable said visor to raise and lower about a pivot point defined by said second fastening mechanism.

12. The helmet recited in claim 1, further comprising a storage compartment molded into a side surface of said second layer.

13. The helmet recited in claim 12, further comprising a door for said storage compartment.

14. The helmet recited in claim 13, wherein said door is hingedly attached.

15. The helmet of claim 13, wherein an exterior surface of said door, when closed, comprises a profile coextensive with said outer layer.

16. The helmet recited in claim 12, further comprising a lanyard affixed to an interior portion of said storage compartment, wherein said lanyard has a clip attached to a distal end thereof.

17. The helmet recited in claim 16, further comprising a recoiling assembly from which said lanyard is attached.

18. The helmet recited in claim 16, further comprising a whistle removably attached to said clip.

19. The helmet recited in claim 1, wherein said switching assembly is provided with an accelerometer.

20. The helmet recited in claim 1, wherein said electrical power supply is a rechargeable power unit.

* * * * *